Patented Sept. 19, 1939

2,173,178

UNITED STATES PATENT OFFICE 2,173,178

DYEING OF TEXTILE AND OTHER MATERIALS

Robert Wighton Moncrieff and Albert William Mortimer Cooke, Spondon, near Derby, England, assignors to Celanese Corporation of America, a corporation of Delaware No Drawing. Application July 17, 1937, Serial No. 154,280. In Great Britain August 5, 1936

4 Claims. (Cl. 8—48)

This invention relates to the colouring of textile and other materials by the formation of azo dyes thereon. The invention is more particularly concerned with the colouration of cellulose acetate or other cellulose ester or ether textiles.

The colouring of cellulose acetate textile materials by forming azo dyestuffs thereon is frequently practised when shades are required of a depth and/or fastness properties not readily obtainable by application of already formed dyestuffs to the material. The diazotisable amines and the coupling components which are most useful for forming azo dyestuffs on cellulose acetate materials are for the most part insoluble in water. Though they are in many cases soluble in aqueous acids or alkalies with formation of salts, these salts generally have a comparatively low affinity for cellulose acetate, so that satisfactory results cannot usually be obtained by applying the azo dye components in the form of these aqueous solutions of their salts. The azo dye components are therefore commonly applied in the form of aqueous dispersions from which the cellulose acetate readily takes up the diazo component or coupling component as the case may be. Though excellent dyeings can be obtained by this expedient, the time required for the absorption of the dye components from the aqueous medium by the cellulose acetate is generally rather long. Further, these aqueous dispersions do not generally give satisfactory results when circulated through compact masses of cellulose acetate textile material, for example bobbins or cops of cellulose acetate yarn or rolls of cellulose acetate textile fabric. Unless the dye component is extremely finely dispersed in the aqueous medium there is a very marked tendency for the outer or inner layers of the package, as the case may be, to filter out and retain an unduly large proportion of the dye component. The result is that the package is unevenly coloured.

We have now found that diazotisable amines or azo coupling components can very satisfactorily be incorporated in cellulose acetate or other cellulose ester or ether textile materials from solutions of the said dyestuff components in organic liquids and according to the present invention, therefore, in the colouration of textile and other materials having a basis of cellulose acetate or other cellulose esters or cellulose ethers with azo dyestuffs by applying a diazotisable amine and a coupling component to the materials and forming an azo dyestuff in the materials from such components, at least one of the said components is applied to the materials from solution in an organic solvent medium.

Solutions of the azo dyestuff components in organic liquids having a boiling point below about 150° C. readily penetrate comparatively tightly wound packages of cellulose acetate yarn or cellulose acetate fabric, and it is possible to secure with their aid uniform impregnation of the material of the package with the azo dyestuff components. Hence, it is of particular advantage in accordance with this invention to employ solutions of the azo dyestuff components in organic liquids which have boiling points below 150° C. For example, a suitably wound package of cellulose acetate yarn may be uniformly impregnated with an azo dye component by circulating a solution of the latter in an organic solvent boiling below 150° C. through the package from the inside to the outside or vice versa, in the manner commonly practised in the dyeing of bobbins or cops of cotton yarn with aqueous solutions of water-soluble dyestuffs.

The new process is of special advantage and utility for the colouring of cellulose acetate yarn or fabric in package form. Other methods of subjecting the textile material to the action of the solution of the dye component in the organic liquid medium may, however, be employed. For example, cellulose acetate yarn in hank or other form may be immersed in a bath of the solution of the azo dye component and allowed to remain until the requisite amount of the dye component has been absorbed by the cellulose acetate. Again, the solutions may be applied to running threads of cellulose acetate or other cellulose ester or ether. For example, the thread may be given a short run, e. g. of the order of a few seconds, through a solution of the azo dye component of suitable concentration, the thread being thereafter dried to remove the organic solvent medium. Padding, printing or other methods of mechanical impregnation may be employed if desired. For instance, the textile material may be treated with the solution of the azo dye component in the manner and with the apparatus described in U. S. applications S. Nos. 124,138, filed February 4, 1937; 123,102, filed January 30, 1937; and 124,139, filed February 4, 1937.

Various diazotisable amino compounds may be applied by the new method. As examples may be mentioned the following:—

Meta- or para-nitraniline;
Nitro-toluidines, e. g. 5-nitro-2-amino-toluene and 3-nitro-4-amino-toluene;
Nitro-anisidines, e. g. 5-nitro-2-amino-anisole, 4-nitro-2-amino-anisole, and 3-nitro-4-amino-anisole;
Anisidines, e. g. ortho-anisidine;
Chlor-anilines, chlor-toluidines, chlor-anisidines, e. g. 2-chlor-aniline, 3-chlor-aniline, 2:5-dichloraniline, 4-, 5- or 6-chlor-2-amino-toluene;
α-naphthylamine or β-naphthylamine;
Amino-azo compounds, for example amino-azo-benzene, o-amino-azo-toluene, 2-ethoxy- or 2-methoxy-benzene-azo-1-naphthylamine, p-amino-benzene-azo-dimethyl-aniline, and p-amino-benzene-azo-α-naphthylamine;
Diamines, e. g. benzidine, di-anisidine, or 4.4'-di-amino-diphenylamine;
Diazotisable aminoanthraquinone derivatives, e. g. α-amino-anthraquinone, and the diazotisable amino-anthraquinone compounds mentioned in U. S. Patent No. 2,040,927.

As examples of coupling components which may be applied by the new method or used to develop diazotisable amines applied by the new method may be mentioned the following:

1. Aromatic amine coupling components with which diazo compounds couple in ortho- or para-position to an amino group, for example para-xylidine, para-cresidine, meta-toluidine, alkyl, aryl, or aralkyl anilines, α- or β-naphthylamine or their alkyl, aryl or aralkyl derivatives, and 1-naphthylamine-2-alkyl ethers.
2. Enolic coupling components;
   (a) Aromatic hydroxy compounds, for example phenol itself, cresols, resorcinol, β-naphthol, 2:3-oxynaphthoic acid, amino-phenols, alkyl or aryl-amino-phenols, e. g. meta-hydroxydiphenylamine, arylamides of hydroxy-aromatic carboxylic acids, e. g. the arylamides of hydroxynaphthoic acids such as 2:3-hydroxy naphthoic acid or 1:4-hydroxynaphthoic acid, or arylamides of ortho-hydroxy-carboxylic acids of carbazole, anthracene, or other polynuclear organic compounds;
   (b) Compounds containing a methylene group capable of coupling with a diazo compound, for example pyrazolones, such as 1-phenyl-3-methyl-5-pyrazolone or arylamides of β-keto-carboxylic acids such as arylamides of aceto-acetic acid or benzoyl acetic acid. Special mention may be made of the diaceto-acetyl or dibenzoyl-acetyl derivatives of aromatic diamines, for example diaceto-acetyl-ortho-tolidine.

In carrying out the new process a diazotisable base may be applied in the form of a solution in an organic liquid medium and the base thereafter diazotised and developed with a suitable coupling component. Again, a coupling component may be applied from solution in an organic liquid medium and the coupling component developed by treatment of the material with a suitable diazo compound. If desired, both a diazotisable base and a coupling component may be applied either together or separately from solution in organic liquids, and the material thereafter treated so as to diazotise the diazotisable base and cause the diazo compound to couple with the coupling component.

This latter method of applying both the diazotisable base and the coupling component to the material before diazotisation of the base is of particular value in the case of using enolic coupling components, especially the arylamides of hydroxy-aromatic-carboxylic acids and coupling components containing methylene groups capable of coupling with diazo compounds. It is of special advantage to apply the base and coupling component together from a single solution. When this method of working is adopted it only remains, in order to obtain the desired colouration on the materials, to diazotise, for example with an acidified nitrite solution, and to effect coupling. With some coupling components, for example β-oxynaphthoic acid, coupling takes place comparatively easily in a weakly acid solution. In other cases, for example when using arylamides of aromatic hydroxy-carboxylic acids or arylamides of β-keto-carboxylic acids, coupling is best effected by an alkaline treatment, for example treatment with a dilute solution of soda ash.

The solutions of the diazotisable amines or coupling components may be prepared with various organic liquids. As examples of organic liquids which may be utilised may be mentioned the following:—

(a) Aliphatic hydrocarbons, particularly those boiling below about 120° C., e. g. petrol;
(b) Aromatic hydrocarbons, for example benzene, toluene, xylene and the like;
(c) Halogenated hydrocarbons, for example carbon tetrachloride, perchlorethylene, and di- or tri-chlorethylene;
(d) Alcohols, for example methyl or ethyl alcohol, propyl alcohol or butyl alcohol;
(e) Esters, for example ethyl acetate, popyl- or isopropyl-acetate or other volatile esters having boiling points below about 150° C.

Mixtures of two or more organic liquids may be utilised if desired, for example the volatile ester containing mixtures referred to in U. S. application S. No. 89,661, filed July 8, 1936, in connection with the application of dyestuffs to textiles. The organic solvent media may also contain organic bases, e. g. pyridine or tetra-substituted ammonium compounds e. g. trimethyl benzyl ammonium hydroxide. Where textile materials having a basis of cellulose esters are treated, however, it is desirable, where saponification of such materials is to be avoided, to employ such organic bases in only small proportions.

The most advantageous solvent medium to employ in any particular case depends upon the particular azo dye components to be applied and the method of application, as well as upon the precise character of the material to be coloured. It is, of course, desirable that the required amount of base and/or coupling component should be soluble in the amount of organic solvent medium which may be conveniently used in the process in relation to the amount of textile material to be coloured. Thus, when applying the solutions to running threads, the solutions must be comparatively concentrated in order that the thread may have incorporated therein the requisite proportion of dyestuff component. In the case, however, where the materials are allowed to absorb the dyestuff components from the solutions, e. g. by immersing the materials in a bath or circulating the solutions through packages of the textile material, the concentration of the dyestuff component will in general be very much lower than when treating running threads.

When the textile material is to absorb the dyestuff component or components from the solution of the dyestuff component or components, it is usually desirable that the organic liquid medium should not have very high solvent power for the dyestuff components. The organic liquid medium should preferably be such as will not, in the quantity it is necessary to use, be capable of dissolving very much more than the requisite quantity of the dyestuff component or components. By observing this condition the solution of the dyestuff component is more completely exhausted by the cellulose ester or ether material than is otherwise the case.

The solvent medium may be one which has a swelling action on the cellulose ester or ether undergoing treatment. A solvent medium of this character is advantageous more particularly when treating running threads.

When applying the dyestuff components by bath methods or by circulating the solutions through packages of yarn or the like, a particularly useful solvent medium for the dyestuff component or components is petrol, carbon tetrachloride or other volatile liquid of similar solvent property, in admixture with a liquid which has a good solvent power for the dyestuff components. Ethyl acetate is a very good example of such liquid. It may be employed in an amount of, for instance, 10 to 25% of the combined amount of petrol or the like and ethyl acetate. Other liquids may be employed in place of ethyl acetate, for example acetone.

As indicated above, the invention is of particular value in connection with the colouring of cellulose ester or ether textile materials in the form of bobbins, cops or other packages. These packages may be specially prepared so as to facilitate the passage of the solution of the dyestuff components therethrough. For example, the packages may be cross-wound using a comparatively rapid traverse. After remaining in contact with the solution of the azo dye component or components the material, whether in bobbin, cop or other form, may be rinsed, for example with solvent of the same kind as that used to prepare the solution, and then dried. It has been found advantageous to carry out the drying of bobbins, cops or the like very rapidly, e. g. by blowing warm air through them. By this expedient the tendency for the dye components to migrate towards the inside or outside of the package during the drying process is greatly diminished.

It is preferable, in order to remove any residual diazotisable amine or coupling component from the materials after the formation of the azo dye, to scour the materials with warm or hot soap solutions. Advantageously the scouring solution may contain a small proportion of a solvent for the residual diazotisable amine or coupling component, e. g. solvent naphtha. If desired, a light scouring of the fabric may be effected before the coupling operation in order to remove excess dyestuff components which remain on the surface of the material.

The invention is illustrated but not limited by the following examples:—

*Example 1*

35 grams of 2:3-oxynaphthoic-meta-nitranilide and 16 grams of 5-nitro-2-amino-toluene are dissolved in 3 litres of ethyl acetate and the solution diluted with 27 litres of petrol. This solution is circulated at about 70° C. through bobbins of cellulose acetate yarn which have been wound with a quick traverse. The bobbins are then washed with cold petrol, quickly dried by blowing warm air through them, and then diazotisation effected by circulating through them a solution of 80 grams of sodium nitrite and 280 ccs. of glacial acetic acid in 20 litres of water for ½ hour at 18° C. They are then washed in water and coupling effected by circulating through the bobbins for ½ hour a .025% solution of sodium carbonate, which is gradually heated up to 80° C. during ½ hour. The material is then rinsed and dried. A fast red shade is thus imparted to the cellulose acetate yarn.

In a similar way a navy blue or black shade may be obtained by using p-amino-benzene-azo-α-naphthylamine as the diazotisable base and β-oxynaphthoic acid as the coupling component. In this case coupling can be effected with dilute acetic acid.

*Example 2*

130 grams of 1-amino-4-(p-aminophenylamino)-anthraquinone are dissolved in 1.5 litres of ethyl acetate and the solution diluted with 13.5 litres of petrol. This solution is circulated at about 70° C. through bobbins of cellulose acetate yarn which have been wound with a quick traverse. The yarn is then well washed with cold petrol and rapidly dried. The dried yarn is treated for about 15 minutes at a temperature of about 15° C. with an aqueous solution containing 0.3% sodium nitrite and 0.25% acetic acid. The yarn is washed with cold water and treated with an aqueous solution containing 0.1% phenol and 0.05% sodium carbonate for about 10 minutes in the cold and then for a further 30 minutes during which the temperature is raised to about 70° C. The yarn is then washed with water and finally scoured with a hot soap solution. As a result of these treatments the yarn is dyed a dark green colour which has a good fastness to rubbing, to light and to laundering treatments.

*Example 3*

65 grams of metanitraniline are dissolved in 1.5 litres of ethyl acetate and the solution diluted with 13.5 litres of petrol. The solution is circulated at about 70° C. through bobbins of cellulose acetate yarn which have been wound with a quick traverse. The yarn is then well washed with cold petrol and quickly dried. The dried yarn is then treated for about 20 minutes at a temperature of about 15° C. with an aqueous solution containing 0.3% sodium nitrite and 1% acetic acid. The yarn is then well washed with cold water and treated with an aqueous solution containing .2% phenol and .1% sodium carbonate for about 10 minutes in the cold and then for a further 30 minutes during which the temperature is raised to about 70° C. The yarn is then washed with water and scoured with a hot soap solution and as a result of these treatments the yarn is dyed a pale straw colour with excellent fastness properties.

The new process is of special value in the colouration of cellulose acetate or other cellulose esters or ethers. As examples of such other esters or ethers may be mentioned cellulose propionate or butyrate, and methyl, ethyl and benzyl cellulose. The textile material may consist of cellulose acetate or other cellulose ester or ether alone, or it may consist of cellulose ester or ether in association with other textile fibres. In this case the other textile fibre may, according to its nature, either be coloured by the treatment or it may remain uncoloured. Textile materials other than cellulose esters or ethers may also be coloured by the new process more particularly such materials as natural silk or other textile materials which have affinity for diazotisable amino compounds or azo coupling components in the free state.

If desired textile materials containing cellulose ester or ether filaments which contain titanium dioxide, carbon black or other pigments may be coloured by the new process. For example, cellulose acetate yarn of low lustre, owing to the presence therein of titanium dioxide, may be coloured. Again, a yarn of cellulose acetate filaments having a grey colour due to the presence of carbon black therein may be topped by the new process.

The new process, while of special value in connection with the colouration of textile materials, may be used for the colouring of other materials having one dimension small, e. g. films or foils of cellulose acetate or other cellulose ester or ether.

Having described our invention, what we desire to secure by Letters Patent is:

1. In the coloration of textile materials having a basis of an organic derivative of cellulose with an azo dyestuff by applying a diazotizable amine and an arylamide of oxynaphthoic acid to the materials and forming the azo dyestuff in the materials from such components, the step of applying the two components to the materials while they are in package form by passing through the package a solution of the said components in an organic solvent medium which comprises 75 to 90% of a substance selected from the group consisting of carbon tetrachloride and petrol and 10 to 25% of a substance selected from the group consisting of acetone and ethyl acetate.

2. In the coloration of textile materials having a basis of cellulose acetate with an azo dyestuff by applying a diazotizable amine and an arylamide of oxynaphthoic acid to the materials and forming the azo dyestuff in the materials from such components, the step of applying the two components to the materials while they are in package form by passing through the package a solution of the said components in an organic solvent medium which comprises 75 to 90% of a substance selected from the group consisting of carbon tetrachloride and petrol and 10 to 25% of a substance selected from the group consisting of acetone and ethyl acetate.

3. In the coloration of textile materials having a basis of an organic derivative of cellulose with an azo dyestuff by applying a diazotizable amine and a coupling component to the materials and forming the azo dyestuff in the materials from such components, the step of applying at least one of the said components to the materials while they are in package form by passing through the package a solution of the said component in an organic solvent medium which comprises 75 to 90% of a substance selected from the group consisting of carbon tetrachloride and petrol and 10 to 25% of a substance selected from the group consisting of acetone and ethyl acetate.

4. Process for the coloration of textile materials having a basis of cellulose acetate with an azo dyestuff, which comprises passing through the materials while they are in package form a solution of a diazotizable amine and a coupling component in an organic solvent medium which comprises 75 to 90% of a substance selected from the group consisting of carbon tetrachloride and petrol and 10 to 25% of a substance selected from the group consisting of acetone and ethyl acetate, and thereafter effecting diazotization of said amine and subsequent coupling.

ROBERT WIGHTON MONCRIEFF.
ALBERT WILLIAM MORTIMER COOKE.